April 19, 1927.
H. L. BOOTH
WAVE MOTOR
Filed Sept. 20, 1926
1,625,519
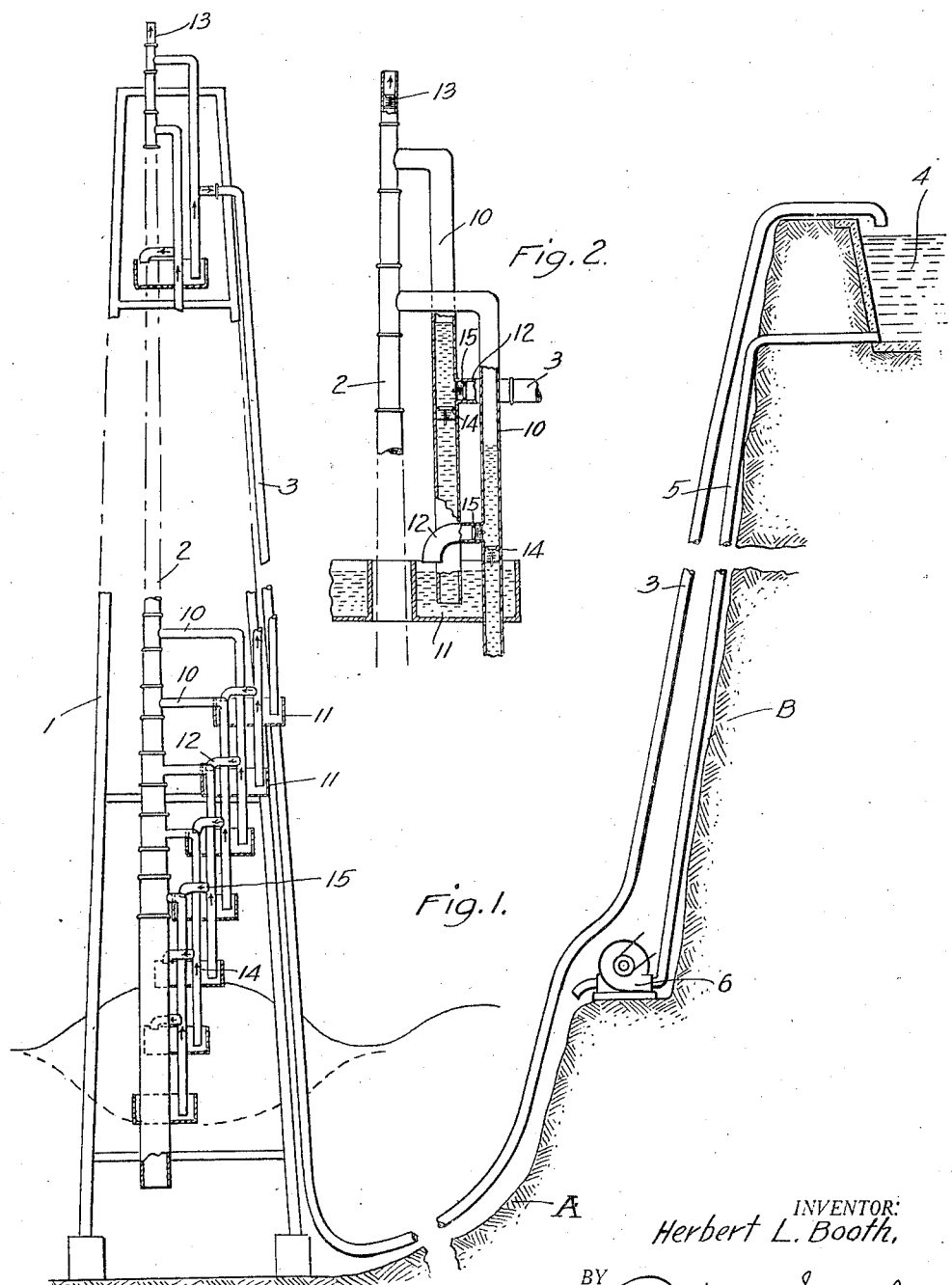
INVENTOR:
Herbert L. Booth,
BY
ATTORNEY.

Patented Apr. 19, 1927.

1,625,519

UNITED STATES PATENT OFFICE.

HERBERT L. BOOTH, OF BEVERLY HILLS, CALIFORNIA.

WAVE MOTOR.

Application filed September 20, 1926. Serial No. 136,520.

It is the object of this invention to utilize the relatively small difference in height between the crest and trough of waves for lifting water to a relatively high elevation, and more particularly to connect a series of reservoirs and arrange the same at succeeding higher elevations so that a partial vacuum created at each transition from the crest to the trough of a wave will correspondingly lift a column of water from each reservoir to the next higher one.

It is a further object of the invention to store the relatively small column of water which is thus elevated from one reservoir to another, in order to provide a water supply of required capacity and at a suitable elevation whereby the supply will provide a sufficient water head for operating a turbine or other power converting medium.

It is a still further object of the invention to provide an extremely simple construction comprising a plurality of interchangeable reservoir units adapted for superimposed assembly in any number, so that succeeding partial vacuum resulting from the lowering of the water level from the crest to the trough of successive waves will lift water from each of the reservoir units to the next higher unit and thereby discharge water at the desired elevation at each wave interval.

Further objects of the invention will be readily understood from the following description of the accompanying drawings, in which:

Fig. 1 is a diagrammatic elevation of the invention in operative position.

Fig. 2 is a detail elevation, partly in axial section, showing next adjacent units of the superimposed assembly.

The invention is preferably embodied in a suitable tower 1 which is erected on a beach A at tide water, the location being one where the ground rises sharply from the beach to form a cliff B. A standpipe 2 is mounted in the tower and is open at its lower end below the surface of the water at low tide; and a pipe 3 which communicates with the upper end of the standpipe leads to a suitable storage reservoir 4 which is preferably built on the cliff B. The water which is elevated in the standpipe is discharged by gravity to the storage reservoir, the elevation of which is adapted to provide a head of water for power development; and as an instance of this arrangement a discharge pipe 5 for the water supply accumulating in the reservoir, may lead to a suitable turbine 6 which is at such a lower level that the head of water in the discharge pipe will develop the necessary power for operating the turbine.

Water is lifted to the upper end of standpipe 2 by the difference in level between the crest and trough of waves which enter the open lower end of the standpipe, said difference in the water level with each succeeding wave, being adapted to create a partial vacuum in the standpipe which is utilized to lift a column of water in successive stages. For this purpose pipes 10 branch from the standpipe at points vertically spaced a distance somewhat less than the minimum difference between the crest and trough of the waves; and these branch pipes extend downwardly so that their length is at least equal to the maximum difference between the crest and trough of the waves, with the ends of the branch pipes opening into a series of relatively small reservoirs 11 which are vertically spaced similarly to the spacing of the connections between the branch pipes and the standpipe. A pipe 12 opens from each of the branch pipes at a level adapted for gravity discharge into the reservoir 11 for the next upper branch pipe, and by suitable valvular controls the successive partial vacuums created in the standpipe by the rise and fall of the waves, is adapted to lift water in the branch pipes from their respective reservoirs 11, and discharge the water through pipes 12 into the next upper reservoirs.

For this purpose the standpipe 2, at every point along its length, is of a cross-sectional area at least equal to the combined cross-sectional areas of all of the branch pipes 10 above said point, in order that a partial vacuum created in the standpipe will form a partial vacuum of approximately corresponding length in each of the branch pipes; and the upper end of the standpipe is provided with an outwardly opening relief valve 13, while each of the branch pipes 10 is provided with an upwardly opening check valve 14 below the pipe 12, and each of the pipes 12 has a check valve 15 opening in the direction of discharge into reservoir 11.

By this arrangement the rise of water in the lower submerged end of the standpipe as a result of transition from the trough to the crest of a wave, will expel air from the standpipe through valve 13, and the subsequent receding of the water as the level drops from the crest to the trough of a wave, creates a vacuum in the standpipe and in the branch pipes as a result of the closing of valves 13 and 15. The partial vacuum elevates water from reservoirs 11 into the respective branch pipes 10, so that the level of the water is above discharge pipes 12, and the next succeeding rise of the water in the standpipe destroys the partial vacuum, so that the water in the branch pipes above the discharge pipes 12 is discharged through the discharge pipes into the next upper reservoir, the check valves 14 preventing return flow to the reservoirs from which the water has been lifted.

One or more of the reservoirs 11 at the lower end of the standpipe are adapted for continuous submergence irrespective of the tide, in order to continuously supply water to the mechanism, and the column of water which is elevated from one reservoir to another, is finally discharged through pipe 3 which is connected to the discharge pipe 12 of the uppermost branch pipe.

I have thus provided extremely simple means for utilizing the difference in water level between the crest and trough of waves, for lifting water from each of a series of superimposed reservoirs to the next higher reservoir, the construction being entirely automatic in its action and providing a lifting action at each successive wave.

I claim:

1. A device of the character described comprising conduits at sucessively higher elevations and all communicating with a body of water having a periodic natural change in the level thereof, means for automatically alternately creating and destroying a vacuum in all of the conduits by said change in the level of the body of water, means for lifting liquid in each of said conduits by said vacuum, and means for automatically discharging the elevated liquid from each of said conduits into the next higher conduit when the vacuum is destroyed.

2. A device of the character described comprising a standpipe open at its lower end into a body of water having a periodic natural change in the level thereof entering the standpipe, means for automatically opening the standpipe to the atmosphere when the liquid level rises and closing said standpipe to the atmosphere when the liquid level is lowered so as to alternately destroy and create a vacuum in the standpipe, and a branch pipe communicating with and depending from the standpipe, said branch pipe opening into a body of liquid and having means for elevating the liquid by the vacuum and discharging the elevated liquid when the vacuum is destroyed.

3. A device of the character described comprising a standpipe open at its lower end into a body of water having a periodic natural change in the level thereof entering the standpipe, means for automatically opening the standpipe to the atmosphere when the liquid level rises and closing said standpipe to the atmosphere when the water level recedes so as to alternately destroy and create a vacuum in the standpipe, a branch pipe communicating with and depending from the standpipe, a reservoir having the branch pipe opening into and submerged in the liquid in the reservoir, and an upwardly opening check valve in the branch pipe permitting elevation of liquid from the reservoir by said vacuum but preventing reverse flow of the liquid when the vacuum is destroyed.

4. A device of the character described comprising a standpipe open at its lower end into a body of water having a periodic natural change in the level thereof entering the standpipe, means for automatically opening the standpipe to the atmosphere when the water level rises and closing said standpipe to the atmosphere when the water level recedes so as to alternately destroy and create a vacuum in the standpipe, a branch pipe communicating with and depending from the standpipe, a liquid reservoir having the branch pipe opening into and submerged in the liquid in the reservoir, an upwardly opening check valve in the branch pipe permitting elevation of liquid from the reservoir by said vacuum but preventing reverse flow of the liquid when the vacuum is destroyed, a discharge from the branch pipe above the check valve, and a check valve in the discharge permitting discharge of the elevated liquid when the vacuum is destroyed but closing against reverse flow when the vacuum is created.

5. A device of the character described comprising a standpipe open at its lower end into a body of water having a periodic natural change in the level thereof entering the standpipe, means for automatically opening the standpipe to the atmosphere when the water level rises and closing the standpipe to the atmosphere when the water level recedes so as to alternately destroy and create a vacuum in the standpipe, a series of branch pipes communicating with and depending from the standpipe at vertically spaced intervals, liquid reservoirs at vertically spaced intervals having the respective branch pipes opening into and submerged in the liquid in the reservoirs whereby the liquid is elevated from the respective reservoirs into their cooperating branch pipes when the vacuum is created, and means for discharging the elevated liquid from each of the branch pipes into the next higher reservoir when the vacuum is destroyed.

6. A device of the character described comprising a standpipe open at its lower end into a body of water having a periodic natural change in the level thereof entering the standpipe, means for automatically opening the standpipe to the atmosphere when the water level rises and closing the standpipe to the atmosphere when the water level recedes so as to alternately destroy and create a vacuum in the standpipe, a series of branch pipes communicating with and depending from the standpipe at vertically spaced intervals, liquid reservoirs at vertically spaced intervals having the respective branch pipes opening into and submerged in the liquid in the reservoirs, the standpipe being of a cross-sectional area at every point along its length at least equal to the combined cross-sectional area of all of the branch pipes communicating with the standpipe thereabove, whereby the vacuum created in the standpipe creates a corresponding vacuum in each of the branch pipes so that the liquid is elevated from the respective reservoirs into their corresponding branch pipes when the vacuum is created, and means for discharging the elevated liquid from each of the branch pipes into the next higher reservoir when the vacuum is destroyed.

In testimony whereof I have affixed my signature.

HERBERT L. BOOTH.